United States Patent [19]

Spinner et al.

[11] 4,108,728

[45] Aug. 22, 1978

[54] ANAEROBIC LIQUID TRANSPORT APPARATUS

[75] Inventors: Ernest Elliott Spinner, Grandview; Lowell Donald Miller; Phyllis Eleanor Riely, both of Kansas City, all of Mo.; Carl Fredrick Avery, Jr., Rockford, Ill.; Melvin Wayne Hounsell, Beloit, Wis.; Ben Bruce Howard, Rockford, Ill.

[73] Assignee: Marion Laboratories, Inc., Kansas City, Mo.

[21] Appl. No.: 709,431

[22] Filed: Jul. 28, 1976

Related U.S. Application Data

[63] Continuation-in-part of Ser. No. 690,528, May 27, 1976, abandoned.

[51] Int. Cl.$^2$ .............................. C12K 1/04; B01J 7/00
[52] U.S. Cl. ..................................... 195/127; 23/282; 128/2 W
[58] Field of Search .............. 195/127, 139; 128/2 W; 23/282

[56] References Cited

U.S. PATENT DOCUMENTS

| | | | |
|---|---|---|---|
| 3,616,263 | 10/1971 | Anandam | 195/127 |
| 3,913,564 | 10/1975 | Freshley | 128/2 W |
| 3,986,935 | 10/1976 | Jackson, Jr. et al. | 195/139 X |

*Primary Examiner*—Alvin E. Tanenholtz
*Assistant Examiner*—Robert J. Warden
*Attorney, Agent, or Firm*—Merriam, Marshall & Bicknell

[57] ABSTRACT

An anaerobic liquid storage and transport apparatus including a liquid receiver means for receiving and holding an anaerobic liquid, a gas generator container means having a self-contained gas generator for generating at least a reducing gas, conduit means for supplying gas from the gas generator into the liquid receiver means, conduit means for removing gas from the liquid receiver means, and a catalyst which promotes reaction between the reducing gas, when produced by the gas generator, and oxygen in, from and/or around the apparatus.

18 Claims, 13 Drawing Figures

ANAEROBIC LIQUID TRANSPORT APPARATUS

This application is a continuation-in-part of our copending application Ser. No. 690,528 filed May 27, 1976, now abandoned.

This invention relates to apparatus useful in connection with biological liquids. More particularly, this invention is concerned with novel apparatus for storing and transporting anaerobic biological liquids of the type which remain viable only when in a gaseous environment or atmosphere low in, or devoid of, oxygen.

Many diseases of man and lower animals are bacterial in origin. The treatment of many bacterial diseases requires that the infecting organism be identified. A drug known to be effective against the infecting organism can then be prescribed.

The identification of an infecting organism is often by means of a liquid sample obtained from the ill patient or animal. Cerebrospinal fluids, deep abscess material, tissue biopsy, transtrachael aspirate, pleural fluid, suprapubic aspirated urine, bone marrow and aspirated joint fluid are representative liquids obtained from a patient which require transport to a testing laboratory. The liquid sample is then tested as required, generally including tests for identification of possible infecting organisms. Such laboratories require highly trained microbiologists and elaborate, expensive equipment. Suitable testing laboratories, accordingly, are not always readily available. It therefore becomes necessary for the patient to visit, or animal be taken to, the laboratory where the liquid sample can be obtained and put immediately into the test procedures or for the liquid sample to be taken at a location remote from the laboratory and then transported to the laboratory for testing.

While the collecting of a liquid sample generally presents no difficulties, the storage and/or transportation of the sample to a testing laboratory under conditions which guarantee it will be viable and free of contaimination upon arrival presents serious problems. Although contamination from other organisms can generally be avoided by suitable means, the maintenance of the sample often requires that it be stored and transported in a particular gaseous environment.

Since bacteria of the anaerobic type are known to require an oxygen-deficient or oxygen-free gaseous environment, it is obvious that the transportation and storage of an anaerobic biological liquid sample should be effected in an environment having little or no oxygen.

The Brewer U.S. Pat. No. 3,246,959 discloses a gas-producing device for generating an atmosphere conducive for maintaining and increasing the viability of organisms which require a special non-toxic atmosphere. The patent shows the chemical generation of hydrogen, carbon dioxide and acetylene for the purpose of supplying a non-toxic atmosphere to a culture in a container. A platinized wire gauze in the container is heated by electricity for the purpose of completely reacting oxygen in the container.

Anandam U.S. Pat. No. 3,616,263 discloses a culture tube for anaerobic cultures. Oxygen is removed from the tube by use of a divided capsule containing aqueous potassium hydroxide and aqueous pyrogallic acid which when combined form a strong reducing agent for the oxygen.

Although the prior art recognizes that various cultures must be maintained under anaerobic conditions, there has been a need for a low cost, reliable, disposable package for storage, transport and/or testing of an anaerobic biological liquid sample.

According to the present invention there is provided an anaerobic liquid storage and transport apparatus comprising a liquid receiver means for receiving and holding an anaerobic biological liquid, a gas generator container means having a self-contained gas generator for generating at least a reducing gas, conduit means for supplying gas from the gas generator to the liquid receiver means, and conduit means for gas exiting from the liquid receiver means. A catalyst which promotes reaction between a reducing gas when produced by the gas generator and oxygen in, from and/or around the apparatus is also employed. The storage and transport apparatus thus provided by the subject invention includes at least a receptable for receiving an anaerobic biological liquid and apparatus which is self-sufficient for producing at least a reducing gas atmosphere, and advisably an atmosphere which is also essentially oxygen-free, in contact with the liquid. Also advisably included is a color indicator apparatus which will show by color change the presence or absence of oxygen in the atmosphere around the anaerobic liquid. The described apparatus is comparatively easily manufactured, low in cost, light-weight and easily utilized. The apparatus is intended to be employed only once and then discarded, making it unnecessary to clean and re-use any parts of the apparatus.

A catalyst may be placed in, or outside of, the liquid storage and transport apparatus. A catalyst is generally located in the conduit means for gas exiting from the liquid receiver means since any back flow of oxygen which may happen to take place will thereby be caused to react with the reducing gas and thus oxygen kept out of contact with a liquid sample in the liquid receiver means. A catalyst can, however, be placed in the gas generator container means, or in the color indicator when joined to the transport apparatus, or a catalyst can be placed in a bag of low permeability for the transport apparatus. A catalyst can be placed in only one of the thus described places or in two or more of such places.

The anaerobic liquid storage and transport apparatus provided by this invention is generally employed in combination with a bag of flexible transparent sheet material of low gas permeability. The liquid storage and transport apparatus is advisably placed in such a bag, and the bag is sealed before the gas generator and the color indicator are activated. The bag serves to prevent oxygen from entering the apparatus and also serves to provide an oxygen-deficient, or essentially oxygen-free, environment inside of the bag around the liquid storage and transport apparatus. Such an environment is produced by the flow of a reducing gas, such as hydrogen, from the liquid storage and transport apparatus, together with any oxygen flushed therefrom, into the bag where the reducing gas is caused to react with oxygen in the bag at ambient temperature by the inclusion of a suitable catalyst in the bag. By removing the oxygen from the bag the liquid storage and transport apparatus permits a liquid sample to be held under anaerobic conditions for a longer period of time, such as for about 96 hours or more, than would otherwise generally be the case.

Both the gas generator and the color indicator apparatus are constructed so that each may be activated from outside, thus making it unnecessary to open either of these elements constituting part of the anaerobic liquid storage and transport apparatus.

The liquid receiver means is provided with a port means for introducing an anaerobic liquid into the liquid receiver means. The port means may constitute a simple closure or cap or it may comprise a self-closing elastomeric material which will reseal after penetration by a hypodermic needle used to place an anaerobic liquid in the liquid receiver means.

The gas generator will generally be one which produces hydrogen as the reducing gas. However, other reducing gases may be produced, such as acetylene. Furthermore, the gas generator may be so-formulated as to produce simultaneously carbon dioxide and a reducing gas. The production of carbon dioxide is often desirable since increased amounts of this gas in the atmosphere surrounding a sample anaerobic liquid are desirable to promote viability of various bacteria.

The gas generator forming part of the anaerobic liquid storage and transport apparatus will usually contain a reducing gas generating solid material, an ampoule containing a liquid which is reactive with the solid material to produce a reducing gas catalytically reactive with oxygen at room temperature, said ampoule being openable from outside the container means to release the liquid to contact the solid material, and means in the container means which prevents liquid from flowing from the container means after the ampoule is opened but which permits flow of reducing gas generated in the container means out of the opening. Furthermore, the gas generator generally contains a solid desiccant material which absorbs water which may enter the container before the ampoule is opened, thereby preventing degradation or premature reaction of the gas generating solid material.

The gas generator container means may be in the form of an elongated flexible tube closed at one end and having an opening at the other end portion in communication with conduit means leading to the liquid receiver means. Furthermore, the ampoule may be placed snugly in the tube and the gas generating solid material located between the tube closed end and the ampoule. An absorbent plug may be located in the tube between the ampoule and the opening in the tube to keep liquid from flowing from the tube after the ampoule is ruptured to release the liquid therein for activation of the gas generating solid material.

The color indicator apparatus used with, or as part of, the anaerobic liquid storage and transport apparatus may comprise an ampoule in the indicator container means, said ampoule containing a redox color indicator liquid, and an absorbent material, for the liquid in the ampoule, in the indicator container means. The color indicator container may be separate from the liquid storage apparatus or it may communicate directly with the liquid receiver means. Also, the color indicator container may be a tube with the ampoule snugly fit in the tube so as to be readily rupturable by squeezing the tube.

The invention will be described further in conjunction with the attached drawings, in which.

So far as is practical, the same numbers will be used to identify the same elements or parts which appear in the various views of the drawings.

The anaerobic liquid storage and transport apparatus 10 as shown in FIGS. 1 to 5 has a liquid receiver means 11 for receiving and holding an anaerobic biological liquid, a gas generator container means 12, and a color indicator container means 13.

The liquid receiver means 11 has a cylindrical body 14 which is closed at one end by wall 15. The other end 16 of cylindrical body 14 is open initially but is subsequently closed by a closure 17 of an elastomeric material, such as rubber, which can be readily penetrated by a hypodermic needle but which is self-sealing after withdrawal of the needle. The space 18 inside of cylindrical body 14 provides a receptacle for receiving a biological liquid sample. A tubular stub 19 extends outwardly from end wall 15 and also inwardly into the space 18 defined by the cylindrical body 14. Opening 20 in tubular stub 19 provides gaseous communication between liquid receptacle space 18 and the space 21 inside of tubular stub 19. Fibrous plug 22 in tubular stub 19 permits flow of gas therethrough but prevents flow of liquid. The end 31 of tube 30 of the gas generator container means 12 is slid over the end of tubular stub 19 to securely join it thereto.

An additional elongated tube 25 is molded into the side wall of cylindrical body 14. The tube 25 has a tubular stud end 26 which extends outwardly from end wall 15 to receive the end 41 of tube 40 of the color indicator container means 13. Opening 27 at the internal end of tube 25 communicates with the liquid receptacle space 18 so that there can be flow of gas from space 18 through opening 27 and into the interior space 28 of tube 25. Fibrous plug 29 is positioned inside of tube 25 adjacent opening 27 to prevent liquid from flowing from space 18. However, plug 29 permits ready flow of gas through it.

The complete liquid receiver means 10 constituting the cylindrical body 14, tubular stub 19 and tube 25 can be readily molded as a unitary object from a suitable polymeric material, such as polypropylene.

Figure 3:
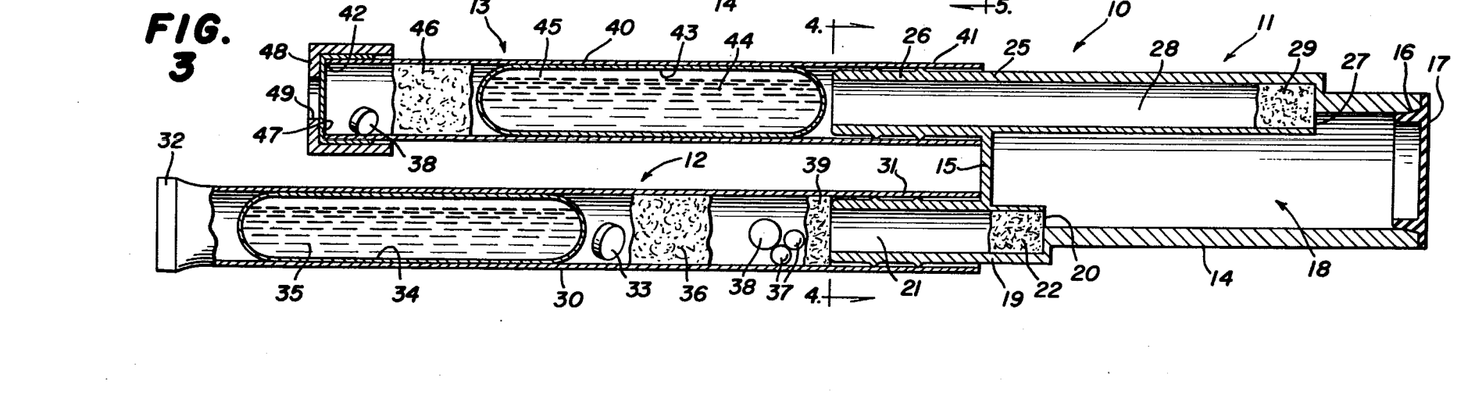
FIG. 3 is a sectional view through the length of the liquid storage and transport apparatus shown in FIG. 1.
Figures 4, 5:
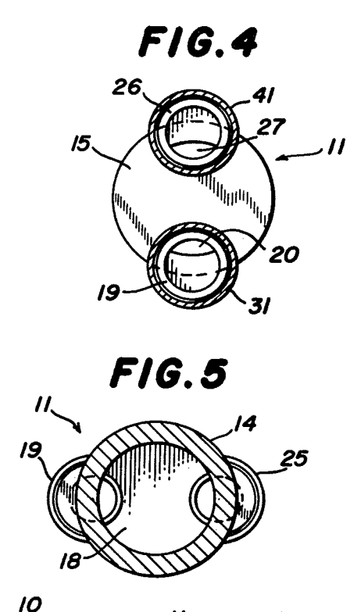
FIG. 4 is a sectional view taken along the line 4—4 of FIG. 3.
FIG. 5 is a sectional view taken along the line 5—5 of FIG. 2.

The gas generator container means 12 comprises elongated plastic tube 30 which is closed at end 32. The tube 30 may be made of a flexible but self-supporting polymeric material such as polyethylene, polypropylene or a polypropylene copolymer such as the one available as Avisun 6011.

One or more gas generating solid tablets or pellets 33 is positioned in tube 30. The tablet 33 has a composition which is suitable for generating a reducing gas such as hydrogen or acetylene, or both a reducing gas and carbon dioxide.

Ampoule 34 is positioned in tube 30 more or less snugly so that is maintains its position. A liquid 35 is contained in ampoule 34. The composition of liquid 35 is selected so that, when released from ampoule 34, it will react with tablet 33 to generate one or more gases. The ampoule 34 can be made of glass or some other material which is nonreactive with liquid 35 or the components of gas generating tablet 33. The ampoule 34 is advisably made so that it will rupture or break upon application of finger pressure to the outside of tube 30 adjacent the ampoule wall. In this way the ampoule may be opened and the liquid 35 freed to react with tablet 33, which will drop into the freed liquid when the tube 30 is held upright.

A liquid absorbent plug 36, such as of polyester fibers, is positioned in tube 30 after the ampoule 34 is placed in the tube. The absorbent plug 36 is thus located between the ampoule 34 and the tube open end so that liquid from the ampoule cannot flow from the tube.

One or more desiccant pellets 37 are advisably positioned between liquid absorbent plug 36 and the open end of the tube 30 as shown in FIG. 3. Any suitable desiccant or water dehydrating material can be used for this purpose although it is preferred to use molecular sieves. Nevertheless, magnesium sulfate or calcium chloride are representative of other desiccant materials which may be used satisfactorily.

Also positioned between liquid absorbent plug 36 and the open end of tube 30 is a catalyst pellet 38. The catalyst pellet 38 is provided to induce catalytic reaction between the reducing gas which is formed by the combination of liquid 35 with tablet 33 and any oxygen which may be in the entire apparatus 10. A 0.5% palladium-on-alumina catalyst may be used when hydrogen is the reducing gas although other catalysts which induce the reaction at room temperature may be employed.

The gas generating tablet 33 may have the following composition when it is desired to produce simultaneously both carbon dioxide and hydrogen as the reducing gas:

| | | |
|---|---|---|
| Potassium borohydride | 13 | mg. |
| Zinc | 13 | mg. |
| Sodium chloride | 15 | mg. |
| Sodium bicarbonate | 52.5 | mg. |
| Lactose DT | 47 | mg. |
| Microporous cellulose - Avicel PH 102 | 57.5 | mg. |
| Tabletting lubricant - Calcium stearate | 2.0 | mg. |

If it is desired to produce only hydrogen and no carbon dioxide the sodium bicarbonate may be omitted from the composition set forth above for tablet 33.

The ampoule 34 may contain as the liquid 35 one ml. of 0.65 N hydrochloric acid in a glass ampoule 1-13/16 inch long. It should be understood, however, that the size of ampoule 34 and the composition and quantity of liquid 35 in the ampoule are coordinated with the ingredients of tablet 33 so as to result in the generation of a predetermined volume of one or more gases as for example an amount which will fill bag 50 when used and closed without developing a gas pressure which will cause it to rupture.

Although the above example illustrates the production of hydrogen as the reducing gas by the use of specific chemicals, i.e. potassium borohydride, zinc, sodium chloride and dilute hydrochloric acid, other solid materials can be used in conjunction with other liquids to produce hydrogen or some other reducing gas which will react catalytically with oxygen to remove it from the space around the biological liquid sample. Thus, water alone can be placed in ampoule 34 and the solid pellet 33 can be formulated to contain a material which reacts with water safely and reasonably quickly to produce hydrogen. Thus, sodium borohydride, lithium aluminum hydride, lithium hydride, calcium hydride, aluminum hydride and lithium borohydride can be used since they react with water as well as aqueous acid to form hydrogen. Such hydrides also react with other liquids such as alcohols to form hydrogen so that sometimes it may be desirable to replace the water or acid with an alcohol, provided it does not adversely affect the biological liquid sample. Hydrogen can, of course, be produced by the reaction of a metal such as iron, zinc, aluminum and magnesium with a suitable acid such as sulfuric acid and hydrochloric acid.

Instead of using hydrogen as the reducing gas to remove oxygen it is feasible to form acetylene by the reaction of calcium carbide in pellet 33 and water or dilute acid in ampoule 34.

The chemical means suitable for generating the gaseous carbon dioxide in the apparatus of this invention is not to be limited to the specific embodiment set forth herein. Other well known chemical means for gaseous carbon dioxide generation may be used. Broadly, any solid material which upon contact with a liquid releases carbon dioxide in adequate amount in a reasonably short time may be used. The least expensive method, of course, is to contact a carbonate or bicarbonate salt with a dilute acid which will not produce vapors having an adverse effect on the biological liquid sample. Instead of putting a dilute acid in the ampoule it can be filled with water, and sodium bicarbonate and citric acid, or some suitable acid salt, can be put in pellet 33 to generate carbon dioxide. Other feasible systems will appear readily to skilled chemists.

The dehydrating agent or desiccant 37 is advisably included in the gas generating apparatus to remove water and water vapor therefrom which may enter the tube 30 during sterilization, such as by ethylene oxide gas sterilization, in the manufacturing process, or to remove water vapor which may penetrate the tube in one way or another. Removal of water in this way is desirable to preserve the stability of the gas generating tablet 33, although it is understood that under some conditions the desiccant may not be necesarily employed.

The color indicator means 13 has an elongated flexible transparent tube 40 which is open at end 42. Tube 40 may be made of any suitable material although a flexible polymeric material such as polyethylene is particularly suitable. Ampoule 43 is snugly positioned within tube 40. The ampoule 43 may be made of any suitable material but desirably is made of relatively thin glass so that it can be easily opened by fracturing the ampoule walls by applying finger pressure through tube 40.

The ampoule 43 contains a liquid redox color indicator 44 which occupies most if not all of the space in the ampoule. The ampoule 43 shown in FIG. 3 contains about 0.3 to 0.6 ml. of liquid and has a top space 45 filled with an inert gas such as nitrogen or carbon dioxide.

A fibrous liquid absorbent plug 46 is snugly positioned in tube 40 between ampoule 43 and open end 42 of the tube. The fibrous plug 46 is made of a material which is nonreactive with the redox liquid such as cotton, polyester fibers or some other such liquid absorbent material.

It is considered advisable to cover end 42 of tube 40 with a bacteriological filter 47 through which microorganisms will not pass. The filter 47 is gas permeable. The filter 47 is held in place by a cap 48 having a hole 49 in the top portion. A catalyst pellet 38 is also advisably placed in tube 40 between plug 46 and filter 47.

The redox color indicator liquid 44 may be selected from any suitable material which will change color when the atmosphere around it changes from one which is oxygen-free to one where there is a significant or substantial amount of oxygen in the atmosphere. Thus, the indicator may have one color in the presence of oxygen and a different color in an atmosphere which is devoid of oxygen. Also, the indicator may be colorless when no oxygen is present and develop a color when oxygen is present, or the indicator may be colorless when oxygen is present and develop a color when no oxygen is present in the surrounding atmosphere.

A particularly useful redox color indicator is resazurin in water. This redox indicator is colorless in an atmosphere devoid of oxygen but in an oxygen-containing atmosphere it has a pink color. When this indicator is used it is advisable to include a small amount of cysteine hydrochloride with it since this ingredient facilitates color change. Another specific redox color indicator which may be used is methylene blue. This indicator is colorless in the absence of oxygen but in oxygen, such as in the presence of air, it has a blue color. It is furthermore desirable that the redox color indicator used be one which is color reversible so that any change from an oxygen-containing atmosphere to an atmosphere deficient of oxygen, or from an atmosphere deficient of oxygen to one containing oxygen, will be indicated by the color change.

The preferred redox color indicator for use in the apparatus is aqueous resazurin containing cysteine. A 0.001% by weight solution of resazurin in water is specificallly useful.

When the liquid redox color indicator liquid 44 is released from the ampoule 43 it flows onto absorbent fibrous plug 46. The liquid is absorbed in this way and held in place so as to provide a relatively easily seen mass which can be observed through the transparent wall of the tube. By making the absorbent plug of a white fibrous material the color of the redox liquid indicator can be readily observed and the presence or absence of oxygen thereby determined.

The described liquid storage and transport apparatus constitutes a disposable throw-away unit which is intended to be employed only once. It is used by placing a liquid sample in space 18 by use of a hypodermic needle which punctures self-sealing closure 17. Once the liquid sample has been placed in the apparatus it is held upright with closure 17 at the top. Ampoule 34 is then broken to free the liquid 35 which reacts with pellet 33 to produce a reducing gas and perhaps also carbon dioxide. Ampoule 43 is also broken to free the redox color indicator liquid 44. Gas generated in tube 30 flows through opening 20, space 18, through opening 27 into tube 40 and out filter 47. The reducing gas catalytically reacts with oxygen in the apparatus to form water by means of catalyst pellets 38 and thereby removes the oxygen, forming an oxygen-deficient atmosphere in the apparatus.

Figure 1:
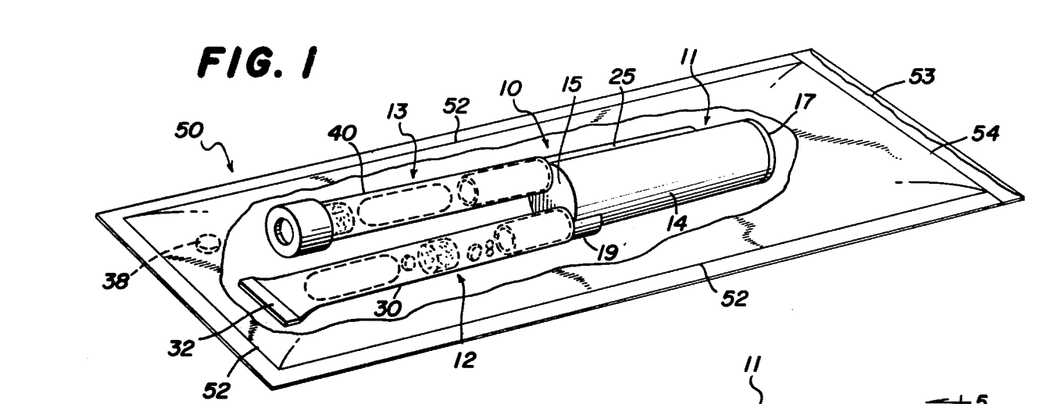
FIG. 1 is an isometric view, partially broken away, of an anaerobic liquid storage and transport apparatus provided by the invention positioned in a bag.
Figure 2:
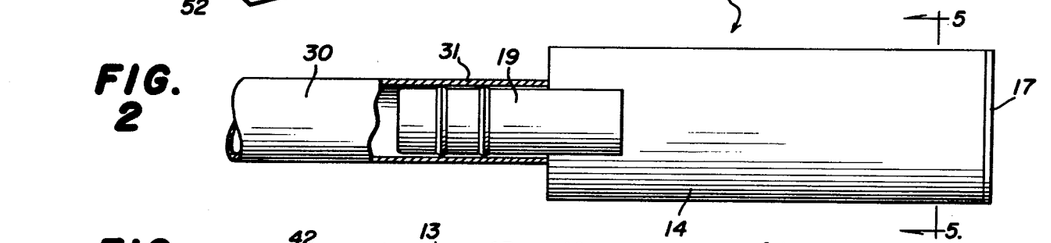
FIG. 2 is a partial side view, partially in section, of the liquid storage and transport apparatus shown in FIG. 1.

The described apparatus is advisably used in conjunction with a bag 50 as shown in FIG. 1. The apparatus 10 is preferably shipped in such a bag 10, which contains a catalyst pellet 38. The bag 50 may be made of transparent polymeric flexible film or sheet material of low gas permeability. The bag 50 may be made of two sheets of plastic film heat sealed 52 around three side edges, thereby leaving an open mouth 53 through which the apparatus 10 is inserted. Specifically, a laminate identified as No. CL5040 (Clear Lam Products) may be used for the bag. The mouth 53 may be left open or be sealed shut in any suitable way, such as by means of heat seal 54. To use the apparatus the bag 50 is cut at heat seal 54 and the apparatus is removed. The liquid sample is then placed in space 18 of the apparatus, the apparatus replaced in bag 50 and the mouth of the bag sealed, such as by a heat seal or by folding the bag mouth over on itself a few times and clipping it together. The ampoules 34 and 43 are then crushed to activate the gas generator and the color indicator. The generated gas flows through the apparatus and out filter 47 into bag 50 which balloons outwardly. The ballooning effect is evidence that the gases have generated as expected. However, immediately upon generation of hydrogen as the reducing gas, the catalyst pellets 38 induce reaction of the hydrogen with the oxygen to form water. The described catalytic removal of oxygen from bag 50 does not significantly affect the ballooning. However, about 48 hours or so after the unit is activated any carbon dioxide which is simultaneously generated may have penetrated the walls of bag 50 causing a vacuum to develop therein. The external atmospheric pressure may then press or collapse the flexible walls of the bag together. This condition may result even without oxygen entering the bag because the gas permeability of the wall material may permit preferential flow of carbon dioxide out of the bag but not oxygen in.

The decrease in oxygen concentration in bag 50 can be evidenced by the pink color of a resazurin saturated plug 46 changing to light pink and finally to white when the plug is made of polyester fibers, indicating the oxygen has been removed. If oxygen subsequently leaks into bag 50 the plug 46 will redevelop a pink color since the color change is reversible when resazurin is used as the color indicator.

When the package as shown in FIG. 1 and containing a liquid sample reaches a laboratory for analysis, the apparatus 10 is removed from bag 50. The liquid sample is then taken out of space 18 and then tested.

Figure 6:
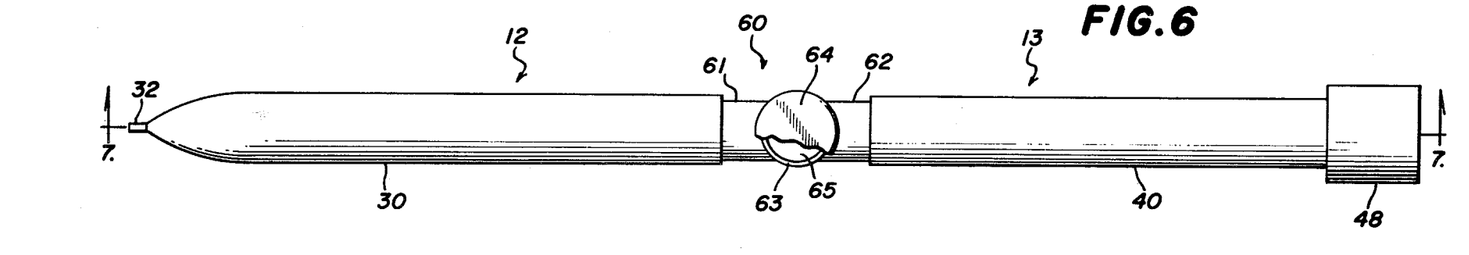
FIG. 6 is a plan view of a second embodiment of a liquid storage and transport apparatus provided by the invention.
Figure 7:
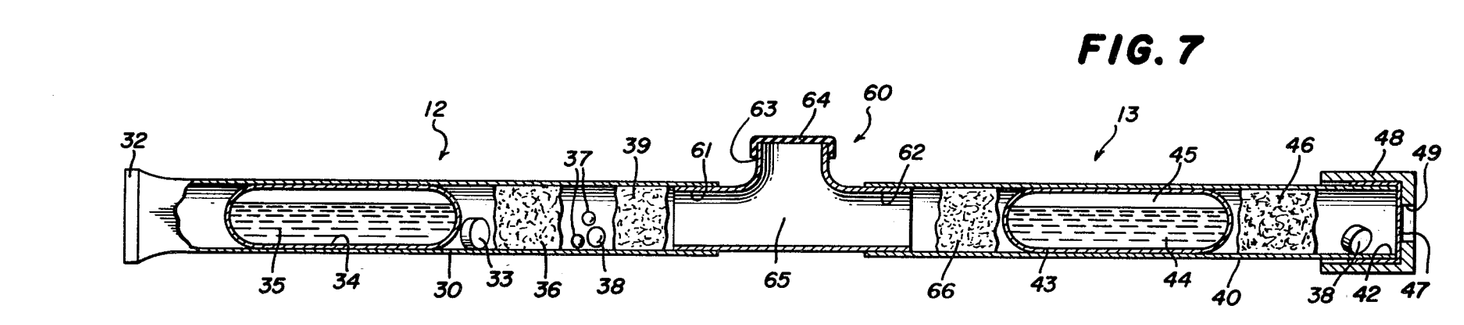
FIG. 7 is a sectional view through the line 7—7 of FIG. 6.

FIGS. 6 and 7 of the drawings illustrate a second embodiment of the invention which, it will be seen, incorporates a gas generator and color indicator essentially identical to those shown in FIGS. 1 to 5. It should be noted, however, that fibrous plug 66 is placed in tube 40 of the color indicator 13 shown in FIGS. 6 and 7 to prevent flow of liquid from ampoule 43 into biological liquid sample receptacle means 60.

The biological liquid sample receptacle means 60 shown in FIGS. 6 and 7 is substantially T-shaped and hollow. The tubular arms 61 and 62 of receptacle means 60 are axially aligned and in communication with lateral tubular extension 63. The end of tube 30 of the gas generator container fits tightly over the end of arm 61 and the end of tube 40 of the color indicator container means fits tightly over the end of arm 62. Closure 64 covers the end of tubular extension 63. Closure 64 can be made of an elastomeric material which is self-sealing after puncturing by a hypodermic needle to place an anaerobic biological liquid sample in space 65 for storage and transport.

The embodiment of the invention shown in FIGS. 6 and 7 operates in the same way as the embodiment shown in FIGS. 1 to 5. However, it should be clear that gas generated from pellet 33 and liquid 35 flows through the entire length of the apparatus and out filter 47. It is advisable, furthermore, to use the apparatus in conjunction with a bag 50 as previously described herein.

Figures 8, 9:
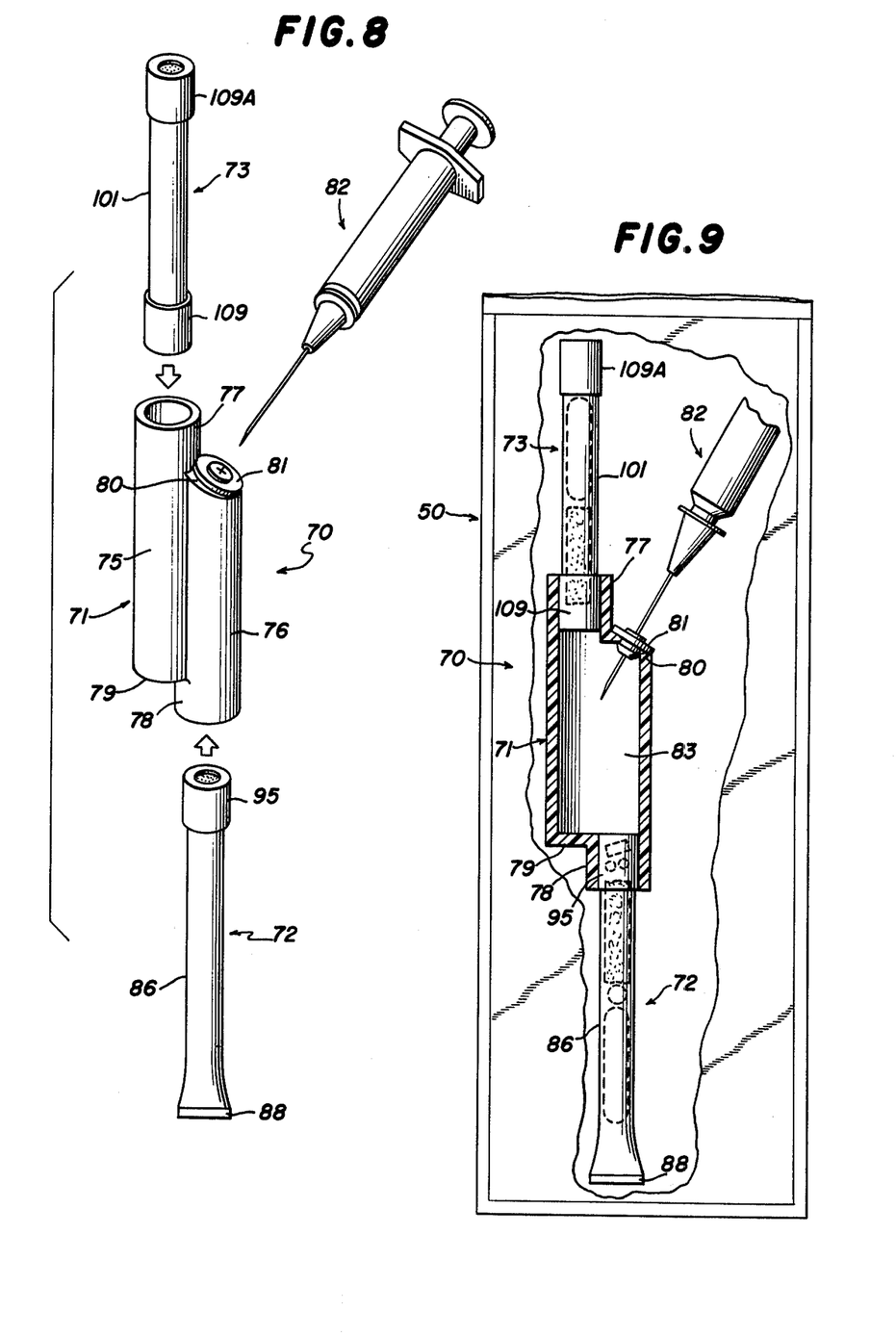
FIG. 8 is an exploded view of a further embodiment of the invention.
FIG. 9 is a partial sectional view of the embodiment shown in FIG. 8.

FIGS. 8 to 11 illustrate a further embodiment of the invention. As shown in FIGS. 8 and 9, the anaerobic liquid storage and transport apparatus 70 has a liquid receiver means 71 for receiving and holding an anaerobic biological liquid, a gas generator apparatus 72, and a color indicator apparatus 73.

The liquid receiver means 71, which may be molded of clear or translucent polymeric material, has a body with an exterior surface appearance of two elongated hollow cylindrical portions 75 and 76 fused together with tubular extensions 77 and 78 extending from the two opposing ends of the body. The cylindrical portion 75 has a closed end 79 while the end 80, which is slanted, of cylindrical portion 76 is provided with a circular opening in which snap plug stopper 81 is positioned. The needle of hypodermic syringe 82 penetrates stopper 81 to put in or remove a liquid sample from the space 83 inside of liquid receiver means 71.

Figure 10:
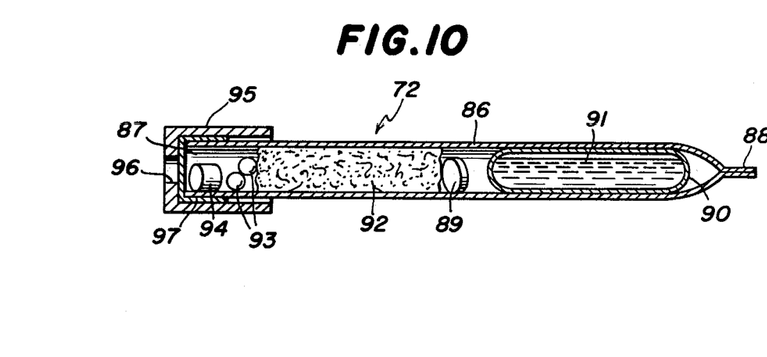
FIG. 10 is a sectional view of the gas generator apparatus used in the embodiment shown in FIGS. 8 and 9.

The gas generating apparatus 72 shown in FIGS. 8, 9 and 10, comprises a container in the form of an elongated plastic tube 86 which is closed at end 88 and is open at end 87. The tube 86 may be made of a flexible but self-supporting polymeric material.

One or more gas generating solid tablets or pellets 89 is positioned in tube 86 above the ampoule 90. The tablet 89 has a composition which is suitable for generating a reducing gas, or both a reducing gas and carbon dioxide, as previously described herein.

Ampoule 90 is positioned in tube 86 more or less snugly so that it maintains its position. A liquid 91 is contained in ampoule 90. The composition of liquid 91 is selected so that it, when released from ampoule 90, will react with tablet 89 to generate one or more gases. The ampoule 90 is advisably made so that it will rupture or break upon application of finger pressure to the outside of tube 86 adjacent the ampoule wall. In this way the ampoule may be opened and the liquid 91 freed to react with tablet 89 which drops into the freed liquid.

A liquid absorbent plug 92, such as of polyester fibers, is positioned in tube 86 after the ampoule 90 is placed in the tube. The absorbent plug 92 is thus located between the ampoule 90 and the tube open end 87 so that liquid cannot flow from the tube. The plug 92 may be covered with a polytetrafluoroethylene-polypropylene laminate (Gore-Tex) which allows passage of gas at low pressure (7 psig) but not liquid.

One or more desiccant pellets 93 are positioned between liquid absorbent plug 92 and the open end 87 of the tube 86. Any suitable desiccant or water dehydrating material can be used for this purpose.

Also positioned between liquid absorbent plug 92 and the open end 87 of tube 86 is one or more catalyst pellets 94. The catalyst pellet 94 is provided to induce catalytic reaction between the reducing gas which is formed by the combination of liquid 91 with tablet 89 and any oxygen which may be in the liquid receiver means 71. A 0.5% palladium-on-alumina catalyst may be used although other catalysts which induce the reaction at room temperature may be employed.

A polymeric cap 95 having a central hole 96 and a covering of a non-woven sheet material 97 is pressed firmly over the open end of tube 86. The sheet material 97 is one which will permit gas generated in tube 86 to flow from the tube readily but which will not permit liquid from space 83 to pass through it. A commercial material marketed as Gore-Tex may be used for the sheet material 97. Specifically, the sheet material 97 may be Gore-Tex L-10477 (W. L. Gore & Assoc., Inc) which is 1.0 mm of polytetrafluoroethylene on non-woven polypropylene.

The gas generator apparatus 72 is secured to the liquid receiver means 71 by firmly forcing the cap 95 into the opening in tubular extension 78.

Figure 11:
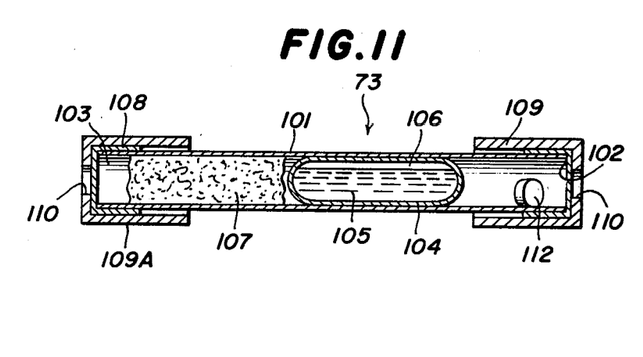
FIG. 11 is a sectional view of the color indicator apparatus used in the embodiment shown in FIGS. 8 and 9.

The color indicator apparatus 73 shown in FIGS. 8, 9 and 11 has an elongated flexible transparent tube 101 which is open at its ends 102 and 103. Tube 101 can be made of any suitable material although a flexible polymeric material such as polypropylene is particularly suitable. Ampoule 104 is snugly positioned within tube 101. The ampoule 104 may be made of any suitable material but desirably is made of relatively thin glass so that it can be easily opened by fracturing the ampoule walls by applying finger pressure against the adjacent surface of tube 101. The ampoule 104 contains a liquid redox color indicator 105 which occupies most if not all of the space in the ampoule. A catalyst tablet or pellet 112 is positioned in tube 101 just pass ampoule 104 to further facilitate reaction of the reducing gas with oxygen. A fibrous liquid absorbent plug 107 is snugly positioned in tube 101 below ampoule 104. The fibrous plug 107 is made of a material which is non-reactive with the redox liquid, such as polyester fibers or some other such liquid absorbent material. Each end of tube 101 is covered with a non-woven sheet material 108, such as Gore-Tex L-10477, which permits gas to pass but not microorganisms and which is not wetted by a liquid sample in space 83. The sheet material 108 at each end of the tube 101 is held in place by caps 109 and 109A. Each cap has a hole 110 in the top portion.

The redox color indicator liquid 105 may be selected from any suitable material which will change color when the atmosphere around it changes from one which is oxygen-free to one where there is a significant or substantial amount of oxygen in the atmosphere.

The color indicator apparatus 73 is secured to the liquid receiver means 71 by firmly forcing the cap 109 into the opening in tubular extension 77.

The embodiment of the invention shown in FIGS. 8 to 11 can be used in the same way as the two other embodiments shown in FIGS. 1 to 7. Also, this embodiment advisably would be used in conjunction with a bag 50 as previously described herein.

Figure 12:
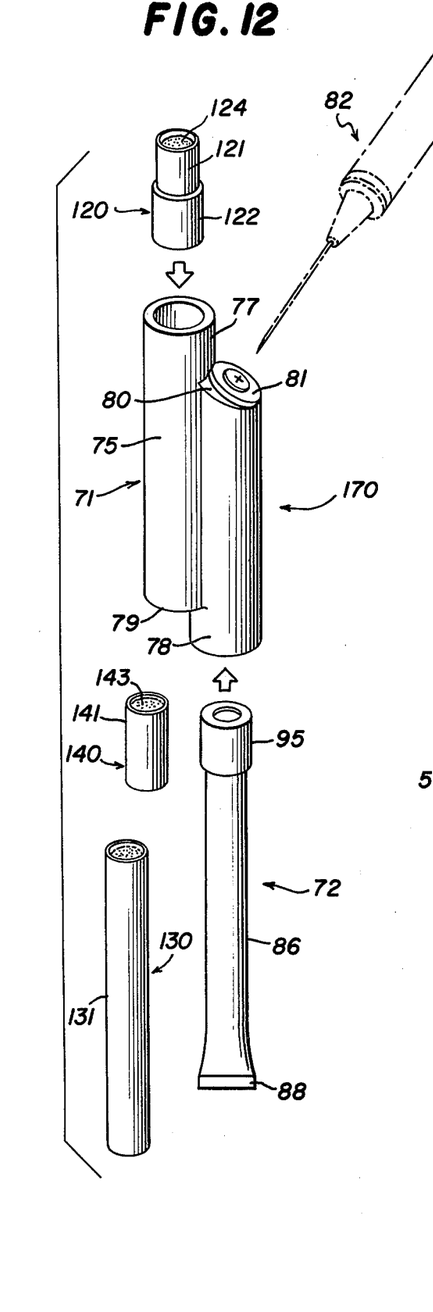
FIG. 12 is an exploded view of another embodiment of the invention.
Figure 13:
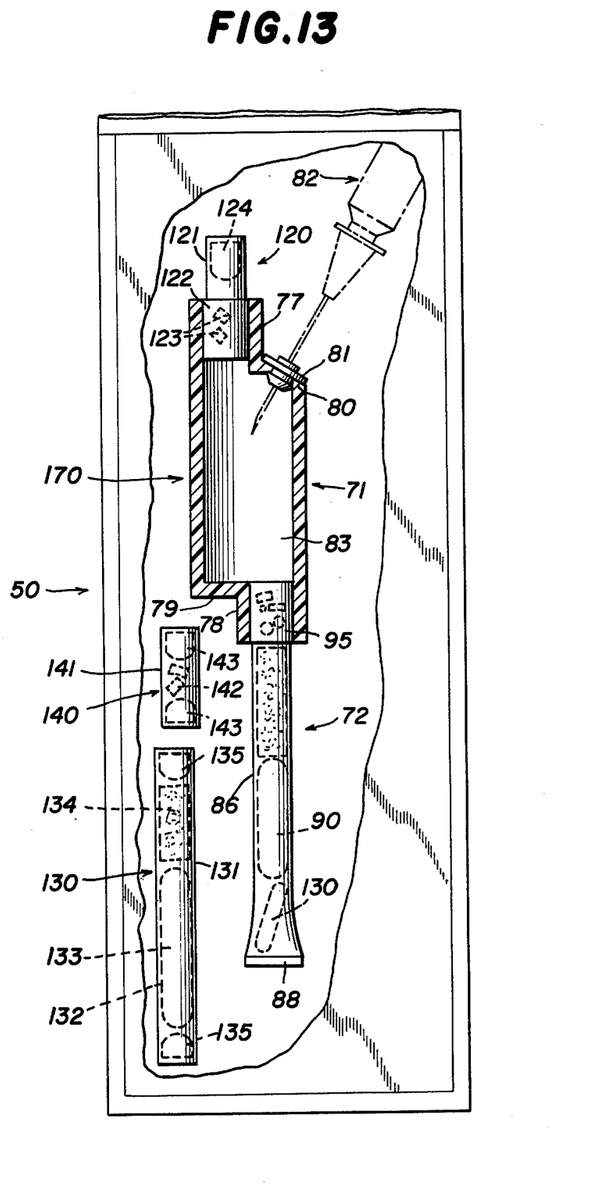
FIG. 13 is a partial sectional view of the embodiment shown in FIG. 12.

FIGS. 12 and 13 illustrate still another embodiment of the invention. This embodiment is very similar to the embodiment shown in FIGS. 8 and 9. The main difference is that the embodiment shown in FIGS. 8 and 9 incorporates a color indicator with the liquid carrier whereas the embodiment of FIGS. 12 and 13 does not employ an integral, but a separated, color indicator.

The anaerobic liquid storage and transport apparatus 170 shown in FIGS. 12 and 13 has a liquid receiver means 71 for receiving and holding an anaerobic biological liquid and a gas generator apparatus 72. These parts of the apparatus 170 are essentially identical with the corresponding parts shown in FIGS. 8 to 11 except that the gas generating tablet 130 is placed below the ampoule 90 rather than above it. Furthermore, inside of the tubular extension 77 there is positioned a water impermeable, gas permeable filter plug 120. Filter plug 120 may contain a catalyst to induce reaction between generated hydrogen and oxygen in the liquid carrier, although the catalyst is not essential but advisably included. The particular filter plug 120 shown in FIGS. 12 and 13 has tubular body 121 covered at one end by a cap 122 having an opening at the top. A covering of a non-woven sheet material is pressed over the end of tube 121 before the cap 122 is placed thereon. The non-woven sheet material is gas permeable but liquid impermeable. The described cap and sheet material are identical with previously described cap 95 and sheet material 97. The cap 122 fits snugly inside of tubular extension 77 for about the full length of the cap. Catalyst pellets 123 are positioned inside of the tube 121 and a gas permeable polyethylene plug 124 is put in the end of the tube to hold the catalyst pellets in place. Plug 124 also prevents bacteria from entering or leaving space 83.

The described liquid transport apparatus develops a lower back pressure in use than the apparatus shown in FIGS. 8 and 9. This is largely due to the absence of the color indicator from tubular extension 77 in the apparatus of FIGS. 12 and 13.

The liquid transport apparatus 170 is used in the same way as are the other embodiments disclosed herein. Furthermore, the liquid transport apparatus 170 is advisably employed in conjunction with a bag 50 as previously described herein. In addition, it is desirable to include in the bag 50, a color indicator 130 and a catalyst holder 140.

The color indicator 130 has an elongated flexible transparent tube 131. Rupturable ampoule 132 is snugly positioned within tube 131. The ampoule 132 contains a liquid redox color indicator 133 which occupies most if not all of the space in the ampoule. A fibrous liquid absorbent plug 134 is snugly positioned in tube 131. A plug 135 of gas-permeable, liquid impermeable expanded polyethylene is positioned inside of each end of tube 131 to complete the color indicator.

The catalyst holder 140 is composed of a flexible tube 141, such as of polyethylene, catalyst pellets 142 and a gas-permeable plug 143 inside each end of the tube. The catalyst pellets 142 are selected to induce reaction between hydrogen gas generated by gas generator 72 and oxygen in bag 50.

It is intended that the unit shown in FIG. 13 comprising bag 50 containing liquid transport apparatus 170, color indicator 130 and catalyst holder 140, be marketed in a second bag, not shown, to preserve the sterility of all the described components. When the unit is to be used, the second bag is opened and discarded. Liquid transport apparatus 170 is then removed from bag 50, a liquid sample placed in space 83, the apparatus then replaced in bag 50 and the bag closed against gas passage. Ampoules 90 and 133 are then crushed to actuate the gas generator and the color indicator. Bag 50 will balloon as hydrogen is generated but subsequently may partially collapse as the hydrogen and oxygen react to form water to thereby lower the gas pressure. The atmosphere inside of bag 50, as well as the liquid transport apparatus 170, becomes oxygen-free or at least very low in oxygen, thus providing an anaerobic environment for the liquid sample.

The foregoing detailed description has been given for clearness of understanding only, and no unnecessary limitations should be understood therefrom, as modifications will be obvious to those skilled in the art.

What is claimed is:

1. An anaerobic liquid storage and transport apparatus comprising:
   a liquid receiver means for receiving and holding an anaerobic liquid;
   a gas generator container means containing a gas generator for generating a reducing gas;
   the gas generator comprising a reducing gas generating solid material, an ampoule containing a liquid which is reactive with the solid material to produce a reducing gas catalytically reactive with oxygen at room temperature, and means in the container means which prevents liquid from flowing from the container means after the ampoule is opened but which permits flow of reducing gas out of the container means;
   first means for supplying reducing gas from the gas generator container means to the liquid receiver means, and second means other than said first means for exit of the reducing gas out of the liquid receiver means without flow of liquid therefrom; and
   a catalyst positioned to promote reaction between the reducing gas, when produced by the gas generator, and oxygen to thereby produce an anaerobic environment in contact with a liquid placed in the liquid receiver means.

2. An apparatus according to claim 1 in a bag of flexible transparent sheet material of low gas permeability.

3. An apparatus according to claim 1 in which the bag contains the catalyst which promotes reaction between the reducing gas and oxygen at room temperature.

4. An apparatus according to claim 1 in which the liquid receiver means has a port means for introducing an anaerobic liquid into the liquid receiver means.

5. An apparatus according to claim 1 in which the gas generator produces hydrogen.

6. An apparatus according to claim 1 in which the means for supplying the reducing gas from the gas generator to the liquid receiver means is a conduit; and
   the means for gas to flow out of the receiver means has means to prevent flow of liquid therethrough from the liquid receiver means and a filter which is impervious to bacteria but is gas permeable and liquid impermeable.

7. An anaerobic liquid storage and transport apparatus comprising:
   a liquid receiver means for receiving and holding an anaerobic liquid;
   a gas generator container means containing a gas generator for generating a reducing gas;
   the gas generator comprising a reducing gas generating solid material, an ampoule containing a liquid which is reactive with the solid material to produce a reducing gas catalytically reactive with oxygen at room temperature, said ampoule being openable from outside the container means to free the liquid to contact the solid material, and means in the container means which prevents liquid from flowing from the container means after the ampoule is opened but which permits flow of reducing gas out of the container means;

first conduit means for supplying reducing gas from the gas generator container means to the liquid receiver means, and second conduit means other than said first conduit means for exit of the reducing gas out of the liquid receiver means without flow of liquid therefrom; and a catalyst positioned to promote reaction between the reducing gas, when produced by the gas generator, and oxygen to thereby produce an anaerobic environment in contact with a liquid placed in the liquid receiver means.

8. An apparatus according to claim 7 in a bag of flexible transparent sheet material of low gas permeability.

9. An apparatus according to claim 7 in which the bag contains the catalyst which promotes reaction between the reducing gas and oxygen at room temperature.

10. An apparatus according to claim 7 in which the liquid receiver means has a port means for introducing an anaerobic liquid into the liquid receiver means.

11. An apparatus according to claim 7 in which the gas generator produces hydrogen.

12. An apparatus according to claim 7 in which a catalyst is located in the conduit means for gas to flow out of the liquid receiver means.

13. An apparatus according to claim 7 in which a catalyst is positioned in the gas generator container means.

14. An apparatus according to claim 7 in which the gas generator has a solid desiccant material therein which absorbs water which may enter the container before the ampoule is opened, thereby preventing degradation or premature reaction of the gas generating solid material.

15. An apparatus according to claim 7 in which the gas generator produces hydrogen and contains a catalyst which induces reaction of the generated hydrogen with oxygen in the air to produce water.

16. An apparatus according to claim 7 in which the gas generator container means is an elongated flexible tube closed at one end and having an opening at the other end in communication with conduit means leading to the liquid receiver means.

17. An apparatus according to claim 16 in which the ampoule fits snugly in the tube and the gas generating solid material is between the tube closed end and the ampoule.

18. An apparatus according to claim 17 in which the means which prevents liquid flow is an absorbent plug located in the tube between the ampoule and the opening in the tube.

* * * * *